United States Patent
Takamatsu et al.

(10) Patent No.: US 8,619,351 B2
(45) Date of Patent: Dec. 31, 2013

(54) OPTICAL PHASE SHIFTER AND DEMODULATOR

(75) Inventors: Hisashi Takamatsu, Kanagawa (JP); Takuma Ban, Kanagawa (JP)

(73) Assignee: Oclaro Japan, Inc., Kanagawa (JP)

( * ) Notice: Subject to any disclaimer, the term of this patent is extended or adjusted under 35 U.S.C. 154(b) by 0 days.

(21) Appl. No.: 13/463,368

(22) Filed: May 3, 2012

(65) Prior Publication Data

US 2012/0287497 A1    Nov. 15, 2012

(30) Foreign Application Priority Data

May 13, 2011  (JP) .................................. 2011-108575
Mar. 29, 2012 (JP) .................................. 2012-77124

(51) Int. Cl.
*G02F 1/01*   (2006.01)
*G02B 26/00*  (2006.01)

(52) U.S. Cl.
USPC ........................... 359/288; 359/290; 359/291

(58) Field of Classification Search
USPC .................... 359/288–292, 295, 298
See application file for complete search history.

(56) References Cited

U.S. PATENT DOCUMENTS

2005/0141845 A1* 6/2005 Mori et al. ..................... 385/147
2009/0303568 A1* 12/2009 Iemura .......................... 359/288

FOREIGN PATENT DOCUMENTS

| JP | 06-021891 A | 1/1994 |
| JP | 2003-287632 A | 10/2003 |
| JP | 2009-300538 A | 12/2009 |
| WO | 2010/109640 A1 | 9/2010 |

* cited by examiner

Primary Examiner — Thomas K Pham
Assistant Examiner — Brandi Thomas
(74) *Attorney, Agent, or Firm* — Mattingly & Malur, PC (57) ABSTRACT

An optical phase shifter according to the invention includes the thermo-optical element of which a refractive index with respect to an input optical signal changes dependently on temperature; a temperature change section, having contact with one end of the thermo-optical element and of which a temperature changes so that a temperature of the thermo-optical element becomes a desired temperature; a heat dissipation section being disposed on an opposite side of the thermo-optical element with respect to the temperature change section and going into a state of thermal equilibrium at a temperature different from the temperature of the temperature change section; and a temperature buffer section, being disposed between the temperature change section and the heat dissipation section, having contact with the temperature change section and the heat dissipation section, and having a heat resistance greater than that of the heat dissipation section.

12 Claims, 5 Drawing Sheets

OPTICAL PHASE SHIFTER AND DEMODULATOR

CROSS-REFERENCE TO RELATED APPLICATION

The present application claims priority from Japanese applications JP 2011-108575, filed on May 13, 2011, and JP 2012-77124, filed on Mar. 29, 2012, the content of which is hereby incorporated by reference into this application.

BACKGROUND OF THE INVENTION

1. Field of the Invention

The present invention relates to an optical phase shifter changing the optical path length of transmitted light by a thermo-optical effect and a demodulator for an optical phase modulation signal which uses the optical phase shifter.

2. Description of the Related Art

In recent years, phase modulation methods have been put to practical use in response to demands for a large capacity and a long range of an optical transmission system. For example, in a phase modulation method such as differential phase shift keying (hereinafter, referred to as DPSK) or differential quadrature phase shift keying (hereinafter, referred to as DQPSK), when a transmitted optical signal is received, demodulation is performed by making the signal optically interfere with an optical signal before one bit and converting phase information into intensity information.

A technique associated with an optical interferometer is disclosed in JP 6-21891 A. As shown in FIG. 1 of JP 6-21891 A, an optical signal transmitted by an optical transmitter is input so as to be branched to two optical paths having different optical path lengths, the branched optical signals are recombined again, the optical signals are interfered by each other due to an effective optical path difference of the optical paths, so that the optical signal is converted into an intensity modulation signal in the optical interferometer. Then, an optical receiver converts the intensity modulation signal converted by the optical interferometer into an electric signal, an amplifier amplifies the electric signal converted by the optical receiver, and a signal processing unit extracts a data signal from the electric signal amplified by the amplifier. In order to demodulate the optical signal with high accuracy, it is necessary to accurately set a delay time granted to one of the optical signals branched in the optical interferometer. As shown in FIG. 2 of JP 6-21891 A, a phase shift unit of the optical interferometer shifts the optical path length.

As means for adjusting the optical path length, there are generally known methods of using physical optical phenomena such as an electro-optical effect, a magneto-optical effect, a photo-elastic effect, and a thermo-optical effect or methods of mechanically moving an optical element.

In the related arts, many optical interferometers are configured by a planar light-wave circuit (hereinafter, referred to as PLC). However, the PLC has the feature in which optical waveguide characteristics are highly sensitive to changes of temperature or mechanical pressure. For this reason, a problem may arise in that cost increases and the size of the PLC increases to stably maintain the optical waveguide characteristics. JP 2003-287632 A discloses a waveguide type optical module including a waveguide element such as a quartz-array waveguide element in which branched-wave wavelength characteristics change dependently on temperature and a temperature control element on which the waveguide element is placed. The temperature control element disclosed in JP 2003-287632 A is configured by a plate-like body that includes a heating member on a surface opposite to a surface on which the waveguide element is placed or in the inside thereof. By decreasing the area in which the temperature control element and a pedestal (external unit) supporting the temperature control element physically have contact with each other and interposing a heat insulator between the temperature control element and the pedestal, heat propagation from the temperature control element (plate-like body) to the pedestal is reduced, thereby ensuring thermal uniformity of a plate surface.

For example, WO 2010-109640 A1 discloses a delay interferometer that uses an optical system (hereinafter, referred to as a free space optical system) using a free space (or medium) as a transmission path. In the delay interferometer disclosed in WO 2010-109640 A1, the length of an optical path is changed by disposing two prisms in two branched optical paths, respectively, and moving one of the prisms.

Further, JP 2009-300538 A discloses an optical phase shifting plate that uses a thermo-optical effect in a free space optical system. In the optical phase shifting plate disclosed in JP 2009-300538 A, an optical substrate capable of changing a refractive index with respect to transmitted light by the thermo-optical effect is mounted on a mounting portion formed in a bottom portion of a package, and a thin film heater is formed on a surface opposite a mounting portion in a surface of the optical substrate.

Since the polarization dependency of the thermo-optical effect is less than that of other physical optical phenomena, an optical phase shifter using the thermo-optical effect is preferable. Further, in the optical phase shifter using the thermo-optical effect, a phase can be shifted only by heat. Therefore, since a mechanism or the like mechanically moving an optical element is not necessary, miniaturization of the interferometer can be anticipated. However, in the free space optical system, when optical phase shift is performed using the thermo-optical effect and a temperature distribution occurs inside an element, a distribution of the refractive index occurs inside the element in response to the temperature distribution. Therefore, optical aberration may occur in response to the distribution of the refractive index. When the optical aberration occurs, coherency may deteriorate in the interferometer, and therefore the characteristics of the optical phase shifter may deteriorate.

When the technology disclosed in JP 2009-300538 A is applied, a thermo-optical element is disposed between the thin film heater serving as a heat source and the mounting portion of the package serving as a heat dissipation portion. Therefore, in the thermo-optical element, a temperature distribution may occur in a portion distant from the heat source or the heat dissipation portion. For this reason, the temperature distribution occurring in a region of an optical signal passing through the thermo-optical element may deteriorate the characteristics of the element. Further, for example, it is difficult to apply the technology disclosed in JP 2003-287632 A to the free space optical system. Therefore, when the area in which the thermo-optical element and the heat source have contact with each other is decreased, the response to changes in temperature is delayed. Thus, a new problem may arise in that practical phase shift may not be suitably realized.

SUMMARY OF THE INVENTION

The invention is devised in the above-mentioned circumstances and an object of the invention is to provide an optical phase shifter, in which optical aberration is reduced by suppressing a temperature distribution in a thermo-optical element, and a demodulator using the optical phase shifter.

(1) According to an aspect of the invention, there is provided an optical phase shifter including: a thermo-optical element of which a refractive index with respect to an input optical signal changes dependently on temperature; a temperature change section which has contact with one end of the thermo-optical element and of which a temperature changes so that a temperature of the thermo-optical element becomes a desired temperature; a heat dissipation section which is disposed on an opposite side of the thermo-optical element with respect to the temperature change section and goes into a state of thermal equilibrium at a temperature different from the temperature of the temperature change section; and a temperature buffer section which is disposed between the temperature change section and the heat dissipation section to have contact with the temperature change section and the heat dissipation section and which has a heat resistance greater than that of the heat dissipation section.

(2) In the optical phase shifter described in (1), the thermo-optical element may be surrounded by an ambient gas. A product $R_1 \times S \times h$ of a heat resistance $R_1$ of the thermo-optical element, an area S of a surface of the thermo-optical element surrounded by the ambient gas, and a heat transfer ratio h of the ambient gas may be less than a desired refractive index distribution ratio $\delta$ of the thermo-optical element.

(3) In the optical phase shifter described in (2), the ambient gas may be a gas which contains nitrogen as a main component.

(4) In the optical phase shifter described in (1), the thermo-optical element may be surrounded by a vacuum. A product $R_1 \times S \times T_o^3$ of a heat resistance $R_1$ of the thermo-optical element, an area S of a surface of the thermo-optical element surrounded by the vacuum, and a cubed absolute temperature $T_o$ of the thermo-optical element may be less than a product $4000000 \times \delta$ of a desired refractive index distribution ratio $\delta$ of the thermo-optical element and a constant 4000000.

(5) In the optical phase shifter described in (1), a product $C_2 \times R_2$ of a heat capacity $C_2$ of the temperature buffer section and a heat resistance $R_2$ of the temperature buffer section may be in the range of half to double of a product $C_1 \times R_1$ of a heat capacitor $C_1$ of the thermo-optical element and a heat resistance $R_1$ of the thermo-optical element.

(6) In the optical phase shifter described in (1), the thermo-optical element may have a pair of surfaces parallel to each other in a region through which the input optical signal passes and the pair of surfaces may be substantially perpendicular to a surface of the thermo-optical element having contact with the temperature change section.

(7) In the optical phase shifter described in (1), an edge of a surface of the thermo-optical element having contact with the temperature change section may be surrounded by the temperature change section.

(8) In the optical phase shifter described in (1), the temperature change section may be a thin film resistor formed on the temperature buffer section and the thermo-optical element may be adhered using an insulating adhesive to make contact with the temperature change section.

(9) In the optical phase shifter described in (1), the thermo-optical element may contain silicon as a main component.

(10) According to another aspect of the invention, there is provided a demodulator including a single or plural the optical phase shifters described in any one of (1) to (9).

(11) In the demodulator described in (10), when the input optical signal is branched into two optical signals, the single or each of the plural optical phase shifters may shift a phase of one of the two optical signals.

(12) The demodulator described in (10) may further include a Mach-Zehnder interferometer. The single or the plural optical phase shifters may be disposed in the Mach-Zehnder interferometer.

(13) The demodulator described in (10) may further include a Michelson interferometer. The single or the plural optical phase shifters may be disposed in the Michelson interferometer.

According to the invention, it is possible to provide the optical phase shifter, in which optical aberration is reduced by suppressing the temperature distribution in a thermo-optical element, and the demodulator using the optical phase shifter.

DETAILED DESCRIPTION OF THE INVENTION

Embodiments of the invention will be described. The scales shown in the drawings are not necessarily identical to the scales described in the embodiment.

First Embodiment

Figure 1:
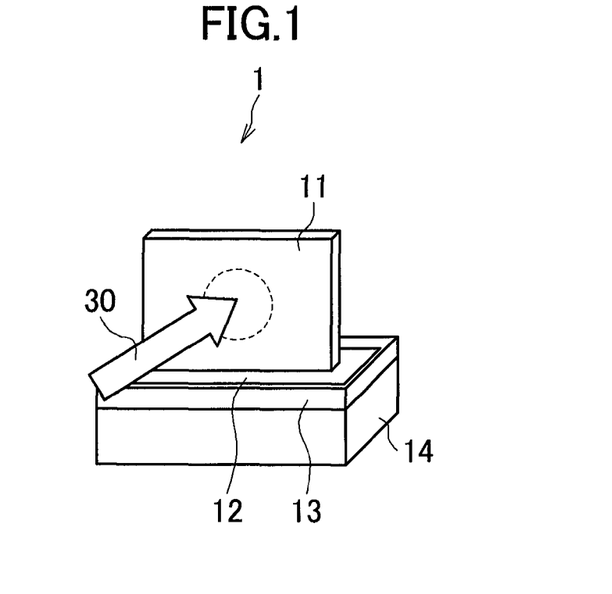
FIG. 1 is a schematic perspective view illustrating the configuration of an optical phase shifter according to a first embodiment of the invention.

FIG. 1 is a schematic perspective view illustrating the configuration of an optical phase shifter 1 according to a first embodiment of the invention. As shown in FIG. 1, the optical phase shifter 1 includes a thermo-optical element 11, a temperature change section 12, a temperature buffer section 13, and a heat dissipation section 14.

The temperature change section 12 is formed of a thin film resistor. The temperature change section 12 is formed in a thin film resistor pattern on the temperature buffer section 13. The temperature change section 12 generates heat in accordance with an amount of current flowing in the thin film resistor.

The thermo-optical element 11 is formed of a silicon substrate. The thermo-optical element 11 has a plate-like rectangular parallelepiped shape. Here, the thermo-optical element 11 has front and rear surfaces which are broadened in a plate shape and are parallel to each other. An optical signal 30 input from the outside enters on the front surface, passes through the thermo-optical element 11, and exits from the rear surface. The thermo-optical element 11 has characteristics in which a refractive index with respect to the optical signal 30 is changed by temperature. That is, the refractive index is changed dependently on temperature. The thermo-optical element 11 also has a bottom surface. The bottom surface of the thermo-optical element 11 has contact with the temperature change section 12 by an insulating adhesive. Here, one end of the thermo-optical element 11 is the bottom surface of the thermo-optical element 11. Further, an edge of the bottom surface of the thermo-optical element 11 is surrounded by the temperature change section 12. The area of the thin film resistor forming the temperature change section 12 is larger than the area of the bottom surface of the thermo-optical element 11. The thermo-optical element 11 also has an upper surface located on the opposite side of the bottom surface and right and left surfaces located on the right and left sides of the front and rear surfaces, respectively. The thermo-optical element 11 is surrounded by an ambient gas which contains nitrogen as a main component. Thus, of the six surfaces of the thermo-optical element 11, the five surfaces other than the bottom surface having contact with the temperature change section 12 have contact with the ambient gas. That is, of the surfaces of the thermo-optical element 11, the surfaces other than a region having contact with the temperature change section 12 are surrounded by the ambient gas.

The heat dissipation section 14 is disposed below the temperature buffer section 13. That is, the heat dissipation section 14 is disposed opposite the thermo-optical element 11 with respect to the temperature change section 12. The temperature buffer section 13 is disposed between the temperature change section 12 and the heat dissipation section 14. Thus, the upper side of the temperature buffer section 13 has contact with the temperature change section 12 and the lower side of the temperature buffer section 13 has contact with the heat dissipation section 14. A heat resistance of the temperature buffer section 13 is larger than a heat resistance of the heat dissipation section 14.

Temperature of the temperature change section 12 is changed so that the temperature of the thermo-optical element 11 becomes a desired temperature. Here, the amount of current flowing in the temperature change section 12 is controlled, and thus the heat of the temperature change section 12 is generated in accordance with the amount of current. The heat generated by the temperature change section 12 is transferred to the thermo-optical element 11 in the upper side of the temperature change section 12 and is transferred to the temperature buffer section 13 in the lower side of the temperature change section 12. The heat transferred to the thermo-optical element 11 dissipates to the ambient gas by heat transfer or thermal radiation to the ambient gas. The heat transferred to the temperature buffer section 13 dissipates to the heat dissipation section 14. Thus, the amount of heat stably becomes tranquil, and thus the temperature is in an equilibrium state.

The optical phase shifter 1 according to this embodiment has characteristics in which a temperature distribution of the thermo-optical element 11 is controlled and a difference in temperature between upper and lower ends of the thermo-optical element 11 is reduced. According to a simple model, the difference in temperature is expressed by a product of the amount of heat flow and a heat resistance. Therefore, when a matter has a heat resistance, a difference in temperature necessarily occurs in proportion to the amount of heat flow in any shape of the matter. Further, the refractive index of the thermo-optical element 11 with respect to the optical signal 30 is changed by temperature. Therefore, when a corresponding change in temperature of the temperature change section 12 occurs to obtain a desired change in the refractive index, the heat is generated, and thus the amount of heat flow increases.

Figure 7:
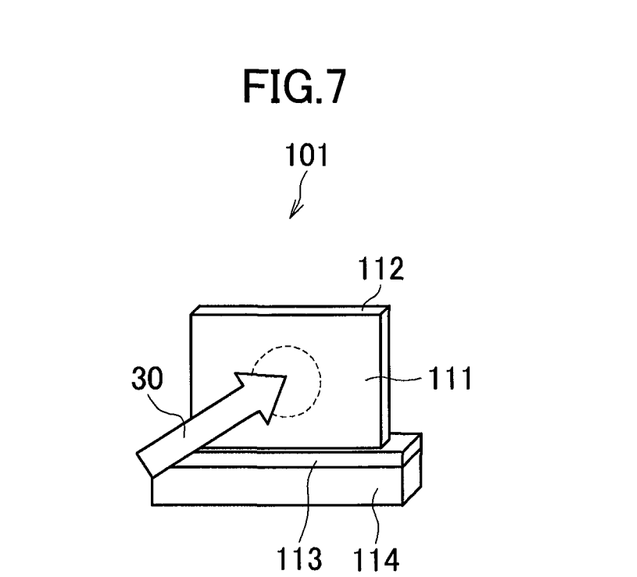
FIG. 7 is a schematic perspective view illustrating the configuration of an optical phase shifter according to a comparative example of the first embodiment of the invention.
Figure 8:
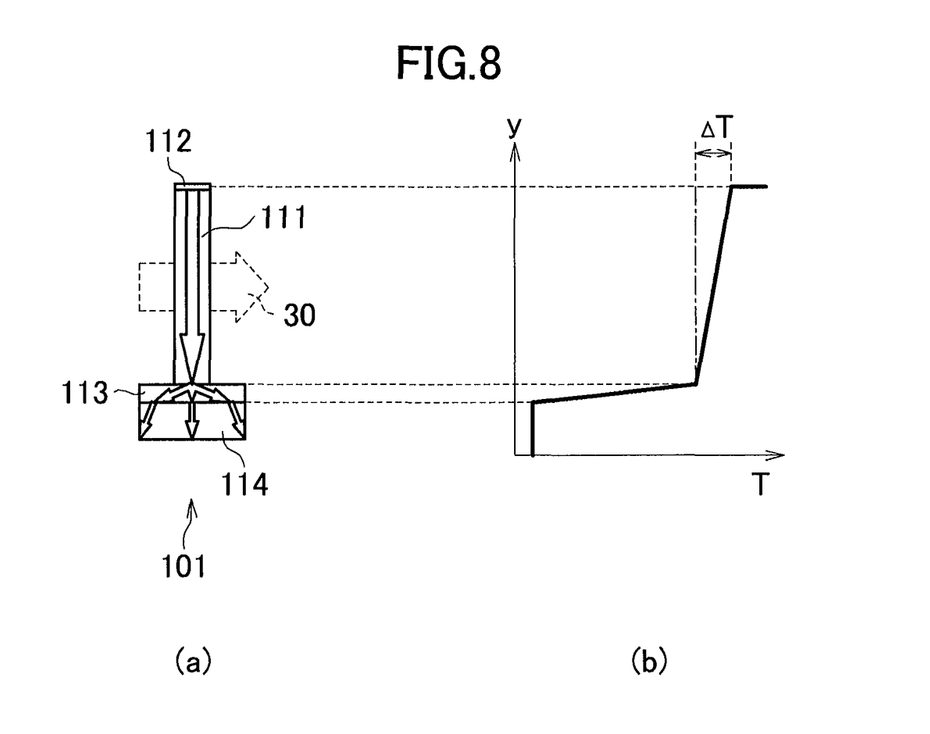
FIG. 8 is a schematic diagrams illustrating a heat flow occurring in the optical phase shifter and a temperature distribution according to the comparative example of the first embodiment of the invention.
Figure 9:
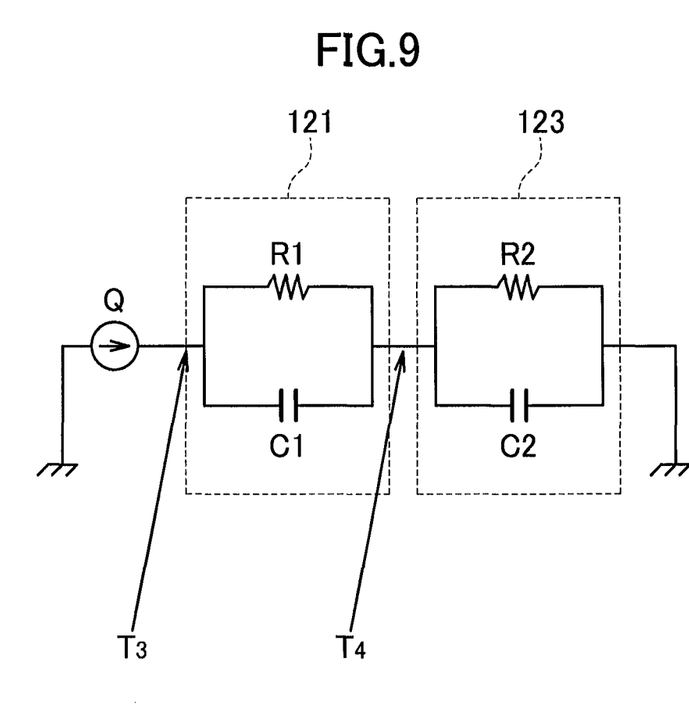
FIG. 9 is a diagram illustrating an equivalent circuit of the optical phase shifter according to the comparative example of the first embodiment of the invention.

Hereinafter, a comparative example of the invention examined by inventors, which is not an example according to the related art, is shown in FIGS. 7 to 9.

To clarify the advantages of the optical phase shifter 1 according to this embodiment, an optical phase shifter 101 according to the comparative example of this embodiment will be compared with the optical phase shifter 1. FIG. 7 is a schematic perspective view illustrating the optical phase shifter 101 according to the comparative example of this embodiment. Similarly to the optical phase shifter 1 according to this embodiment, the optical phase shifter 101 includes a thermo-optical element 111, a temperature change section 112, a temperature buffer section 113, and a heat dissipation section 114. However, the optical phase shifter 101 is different from the optical phase shifter 1 in disposition of the components. In particular, the temperature change section 112 is formed on an upper surface of the thermo-optical element 111 and the thermo-optical element 111 is disposed on the temperature buffer section 113 so as to have contact with the temperature buffer section 113. Therefore, part of the heat generated in the temperature change section 112 dissipates to the ambient gas. However, a considerable amount of heat generated in the temperature change section 112 is transferred to the thermo-optical element 111 and is then transferred to the temperature buffer section 113 and the heat dissipation section 114.

FIG. 8 is a schematic diagrams illustrating a heat flow formed in the optical phase shifter 101 and a temperature distribution according to the comparative example of this embodiment. FIG. 8 shows a desired amount of heat generated in the temperature change section 112 and the optical phase shifter 101 in thermal equilibrium. The heat flow formed in the optical phase shifter 101 is shown in FIG. 8(a). As described above, the heat generated in the temperature change section 112 located on the upper side is transferred to the thermo-optical element 111 and is then transferred downward to the temperature buffer section 113 and the heat dissipation section 114. The direction of an arrow indicates the direction of the heat flow and the thickness of the arrow indicates the magnitude of the amount of heat flow. The temperature distribution occurring in the optical phase shifter 101 is shown in FIG. 8(b). Vertical and horizontal axes of the drawing represent a height y and a temperature T in the height y. As described above, the difference in temperature occurs in proportion to the amount of heat flow. Therefore, in the optical phase shifter 101, a temperature gradient shown in FIG. 8(b) occurs in accordance with the height. The heat resistance of the temperature buffer section 113 is the largest and the temperature gradient occurring in the temperature buffer section 113 is the largest. The heat resistance of the thermo-optical element 111 is less than the heat resistance of the temperature buffer section 113, but the temperature gradient also occurs in the thermo-optical element 111. Here, the difference in temperature between upper and lower ends of the thermo-optical element 111 is denoted by ΔT in the drawing. Further, since the heat resistance of the heat dissipation section 114 is sufficiently less than the heat resistance of the thermo-optical element 111 or the heat resistance of the temperature buffer section 113, the temperature gradient is very small in the heat dissipation section 114.

Figure 2:
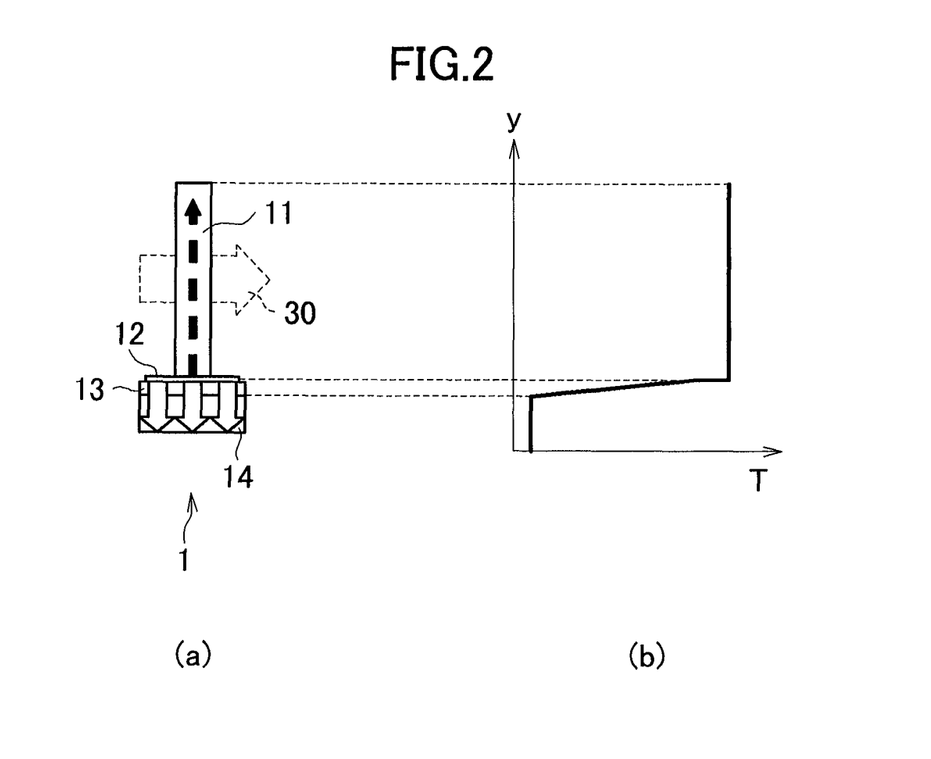
FIG. 2 is a schematic diagrams illustrating a heat flow occurring in the optical phase shifter and a temperature distribution according to the first embodiment of the invention.

FIG. 2 is a schematic diagrams illustrating a heat flow and a temperature distribution occurring in the optical phase shifter 1 according to this embodiment. FIG. 2 shows desired amount of heat generated in the temperature change section 12 and the optical phase shifter 1 in thermal equilibrium. The heat flow formed in the optical phase shifter 1 is shown in FIG. 2(a). As described above, the heat generated in the temperature change section 12 located between the thermo-optical element 11 and the temperature buffer section 13 is transferred to the thermo-optical element 11 in the upper side and is transferred to the temperature buffer section 13 and the heat dissipation section 14 in the lower side. As in FIG. 8(a), the direction of an arrow indicates the direction of the heat flow and the thickness of the arrow indicates the magnitude of the amount of heat flow. In the state of the thermal equilibrium, the amount of heat flow formed from the temperature change section 12 to the thermo-optical element 11 is sufficiently smaller than the amount of heat flow formed from the temperature change section 12 to the temperature buffer section 13 and the heat dissipation section 14. Therefore, the heat flow formed from the temperature change section 12 to the thermo-optical element 11 is denoted by a dotted arrow in the drawing. The temperature distribution occurring in the optical phase shifter 1 is shown in FIG. 2(b). Vertical and horizontal axes of the drawing represent a height y and a temperature T in the height y. As described above, the difference in temperature occurs in proportion to the amount of heat flow. Therefore, in the optical phase shifter 1, a temperature gradient shown in FIG. 2(b) occurs in accordance with the height. In the state of the thermal equilibrium, the heat resistance of the temperature buffer section 13 is the largest and the temperature gradient occurring in the temperature buffer section 13 is the largest, as in FIG. 8(b). However, the optical phase shifter 1 is different from the optical phase shifter 101 according to the comparative example in that the amount of heat flow formed in the thermo-optical element 11 is sufficiently smaller than the amount of heat flow formed in the temperature buffer section 13. Therefore, in the state of the thermal equilibrium, the temperature gradient occurring in the thermo-optical element 11 is very small. That is, the temperature difference occurring between upper and lower ends of the thermo-optical element 11 is very small. Further, the heat resistance of the heat dissipation section 14 is sufficiently smaller than the heat resistance of the thermo-optical element 11 and the heat resistance of the temperature buffer section 13. In the heat dissipation section 14, the temperature gradient is very small and the state of the thermal equilibrium is realized at a temperature different from the temperature of the temperature change section 12, here, a temperature lower than the temperature of the temperature change section 12. Since the temperature gradient is very small in the heat dissipation section 14, the temperature of the heat dissipation section 14 is considered to be constant.

In general, as for the difference in temperature of the thermo-optical element, a refractive index distribution ratio $\delta$ satisfying "$\Delta T/T=\delta$" occurs in the thermo-optical element, when there is a temperature difference $\Delta T$ in the thermo-optical element with respect to an average temperature T of the thermo-optical element going into the state of the thermal equilibrium. Here, the average temperature T refers to an average of the temperatures of the upper and lower ends of the thermo-optical element. The temperature difference $\Delta T$ refers to a difference in temperature between the upper and lower ends of the thermo-optical element. The refractive index distribution ratio $\delta$ is a ratio of a distribution of the refractive index to an average refractive index of the thermo-optical element. Here, the average refractive index refers to an average of the refractive indexes of the upper and lower ends of the thermo-optical element. The distribution of the refractive index refers to a difference between the refractive indexes of the upper and lower ends of the thermo-optical element.

Here, the temperature refers to a temperature with respect to a temperature (hereinafter, referred to as a reference temperature) serving as a reference such as a room temperature. That is, the temperature refers to a temperature change from the reference temperature. Accordingly, the average temperature T refers to an average of the temperature change from the reference temperature of the upper end of the thermo-optical element and the temperature change from the reference temperature of the lower end of the thermo-optical element. Likewise, the refractive index refers to a refractive index with respect to a refractive index (hereinafter, referred to as a reference refractive index) serving as a reference such as a refractive index, for example, at the room temperature. That is, the refractive index refers to a change in the refractive index from the reference refractive index. Accordingly, the average refractive index refers to an average of the change in the refractive index of the upper end of the thermo-optical element from the reference refractive index and the change in the refractive index of the lower end of the thermo-optical element from the reference refractive index. Accordingly, the average refractive index is defined as an average of the changes in the refractive index with respect to the reference refractive index. Likewise, the refractive index distribution ratio $\delta$ may be defined as a ratio of the distribution of the refractive index to the average of the change in the refractive index with respect to the reference refractive index.

When the refractive index distribution ratio $\delta$ occurs, for example, the degree of one wavelength is changed as a phase shift amount, an optical aberration of $\delta \times \lambda$ occurs on the definition that $\lambda$ is a wavelength. In regard to the optical aberration, a phase deviation is preferably less than $0.01\lambda$ in order to obtain good coherency when an optical signal which passes through the thermo-optical element and is shifted in phase interferes with another optical signal. That is, the temperature difference $\Delta T$ of the thermo-optical element is preferably less than 0.01 T in correspondence with the refractive index distribution ratio $\delta$.

Hereinafter, the advantages of the optical phase shifter 1 according to this embodiment will be described in consideration of not only the temperature difference but also temperature change efficiency and response speed. Here, the property of the temperature of each section of the optical phase shifter 1 is expressed by a heat capacity and a heat resistance. When the heat flow is substituted with current and the temperature change section 12 is substituted with a current source, a model equivalent to an electric circuit can be applied.

FIG. 9 is a diagram illustrating an equivalent circuit of the optical phase shifter 101 according to the comparative example of this embodiment of the invention. Here, it is assumed that Q is an amount of heat generated in the temperature change section 112, $C_1$ is a heat capacity of the thermo-optical element 111, $R_1$ is a heat resistance of the thermo-optical element 111, $C_2$ is a heat capacity of the temperature buffer section 113, $R_2$ is a heat resistance of the change buffer section 113, $T_3$ is a temperature of the temperature change section 112 and the upper end of the thermo-optical element 111, and $T_4$ is a temperature of a contact portion between the thermo-optical element 111 and the temperature buffer section 113. In the equivalent circuit of the optical phase shifter 101 shown in FIG. 9, an equivalent circuit model 121 of the thermo-optical element 111 can be configured by a parallel circuit of the resistance $R_1$ and the capacity $C_1$ and an equivalent circuit model 123 of the temperature buffer section 113 can be configured by a parallel circuit of the resistance $R_2$ and the capacity $C_2$. Here, a ground potential (GND) in the electric circuit corresponds to the reference temperature. The temperatures $T_3$ and $T_4$ correspond to a change in temperature with respect to the reference temperature and a potential (potential difference from the ground potential) of the electric circuit serving as the equivalent circuit with respect to the ground potential.

When the model equivalent to the electric circuit is analyzed, the temperatures $T_3$ and $T_4$ can be expressed by Equation 1 below.

$$T_3 = R_1 Q\left(1 - e^{-\frac{t}{C_1 R_1}}\right) + R_2 Q\left(1 - e^{-\frac{t}{C_2 R_2}}\right) \quad \text{[Equation 1]}$$

$$T_4 = R_2 Q\left(1 - e^{-\frac{t}{C_2 R_2}}\right)$$

In this equation, the temperature difference ΔT in the thermo-optical element 111 can be expressed by Equation 2 below.

$$\Delta T = T_3 - T_4 = R_1 Q\left(1 - e^{-\frac{t}{C_1 R_1}}\right) \quad \text{[Equation 2]}$$

Here, when a desired temperature of the thermo-optical element 111 is "$T_3=(R_1+R_2)\times Q$" in the state of the thermal equilibrium, the temperature difference $\Delta T = R_1 \times Q$. Therefore, a ratio $\Delta T/T_3$ can be expressed by Equation 3 below.

$$\frac{\Delta T}{T_3} = \frac{R_1}{R_1 + R_2} \quad \text{[Equation 3]}$$

In Equation 3, $\Delta T/T_3$ in the thermo-optical element 111 can be expressed by a ratio of the heat resistance of the thermo-optical element 111 to the entire heat resistance of the optical phase shifter 101. To decrease the temperature distribution of the thermo-optical element 111, the heat resistance $R_2$ of the temperature buffer section 113 may be greater than the heat resistance $R_1$ of the thermo-optical element 111. In this case, as understood from Equation 1, $C_2 \times R_2$ is dominant in a response time constant of the temperatures $T_3$ and $T_4$. When the heat capacity $C_2$ of the temperature buffer unit 113 is decreased, the response speed is faster. However, since there is a limit to the decrease in the heat capacity $C_2$ in principle, the response time constant of the thermo-optical element 111 considerably increases when the heat resistance $R_2$ increases. Therefore, the response speed is low and the phase shift is very slow, thereby causing an unpractical result.

Figure 3:
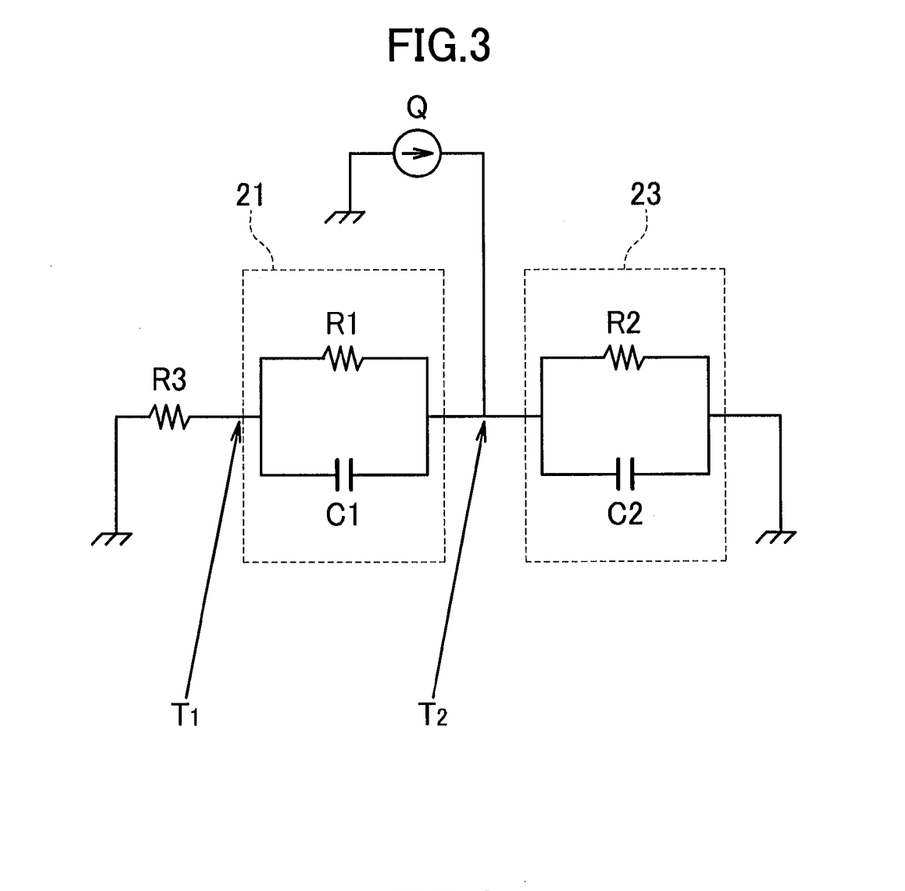
FIG. 3 is a diagram illustrating an equivalent circuit of the optical phase shifter according to the first embodiment of the invention.

FIG. 3 is a diagram illustrating an equivalent circuit of the optical phase shifter 1 according to this embodiment of the invention. Here, it is assumed that Q is an amount of heat generated in the temperature change section 12, $C_1$ is a heat capacity of the thermo-optical element 11, $R_1$ is a heat resistance of the thermo-optical element 11, $C_2$ is a heat capacity of the temperature buffer section 13, $R_2$ is a heat resistance of the change buffer section 13, $T_1$ is a temperature of the upper end of the thermo-optical element 11, and $T_2$ is a temperature of a contact portion between the thermo-optical element 11 and the temperature change section 12 of the temperature buffer section 13 when the temperature of the temperature change section 12 is constant. Similarly to FIG. 9, in the equivalent circuit of the optical phase shifter 1 shown in FIG. 3, an equivalent circuit model 21 of the thermo-optical element 11 can be configured by a parallel circuit of the resistance $R_1$ and the capacity $C_1$ and an equivalent circuit model 23 of the temperature buffer section 13 can be configured by a parallel circuit of the resistance $R_2$ and the capacity $C_2$. As described above, the optical phase shifter 1 is different from the optical phase shifter 101 according to the comparative example in that the temperature change section 12 is disposed differently. Therefore, as shown in FIG. 3, a current source corresponding to the temperature change section 12 is differently disposed. Further, it is assumed that $R_3$ is a heat resistance corresponding to the heat transfer and the thermal radiation from the thermo-optical element 11 to the ambient gas. When the model equivalent to the electric circuit is analyzed and associated approximation thereto is analyzed due to the fact that the heat resistance $R_3$ is sufficiently greater than the heat resistances $R_1$ and $R_2$, the temperatures $T_1$ and $T_2$ can be expressed by Equation 4 below through the associated approximation.

$$T_1 \approx R_2 Q\left(1 - \frac{R_1}{R_3}\right)\left[-\frac{C_1 R_1}{(C_1 R_1 - C_2 R_2)} e^{-\frac{1}{C_1 R_1}t} + \right. \quad \text{[Equation 4]}$$

$$\left. \frac{C_2 R_2}{(C_1 R_1 - C_2 R_2)} e^{-\frac{1}{C_2 R_2}t} + 1\right]$$

$$T_2 \approx R_2 Q\left[-\frac{C_1 R_1}{(C_1 R_1 - C_2 R_2)} e^{-\frac{1}{C_1 R_1}t} + \right.$$

$$\left. \frac{C_2 R_2}{(C_1 R_1 - C_2 R_2)} e^{-\frac{1}{C_2 R_2}t} + 1\right]$$

In this equation, the temperature difference "$\Delta T = T_2 - T_1$" in the thermo-optical element 11 can be expressed by Equation 5 below.

$$\Delta T \approx \frac{R_1 R_2}{R_3} Q\left[-\frac{C_1 R_1}{(C_1 R_1 - C_2 R_2)} e^{-\frac{1}{C_1 R_1}t} + \right. \quad \text{[Equation 5]}$$

$$\left. \frac{C_2 R_2}{(C_1 R_1 - C_2 R_2)} e^{-\frac{1}{C_2 R_2}t} + 1\right]$$

Here, when a desired temperature of the thermo-optical element 11 is "$T_2 = R_2 \times Q$" in the state of the thermal equilibrium, the temperature difference $\Delta T = (R_1 \times R_2/R_3) \times Q$. Therefore, a ratio $\Delta T/T_2$ can be expressed by Equation 6 below.

$$\frac{\Delta T}{T_2} \approx \frac{R_1}{R_3} \quad \text{[Equation 6]}$$

Since $R_3$ is sufficiently greater than $R_1$, as described above, it can be understood that the temperature difference ΔT in the thermo-optical element 11 is very small. Further, the desired temperature $T_2$ of the thermo-optical element 11 is $R_2 \times Q$ and is proportional to $R_2$. However, since it is meant that the heat resistance $R_2$ of the temperature buffer section 13 is greater, it can be understood that the temperature change efficiency of the optical phase shifter 1 is high.

As expressed in Equation 4 and Equation 5, two components $C_1 \times R_1$ and $C_2 \times R_2$ appear for the response time constant. Since the entire response is rate-controlled to a greater time constant between the time constants, a greater response speed between $C_1 \times R_1$ and $C_2 \times R_2$ is determined as the response speed of the optical phase shifter 1.

Hereinafter, a case in which $C_1 \times R_1$ and $C_2 \times R_2$ are substantially the same as each other will be considered. In this case, the denominator of each term of Equation 4 and Equation 5 becomes 0, and therefore an inappropriate case may occur. Therefore, when the values of $C_1 \times R_1$ and $C_2 \times R_2$ are substantially the same as each other, re-calculation is performed. Then, the temperatures $T_1$ and $T_2$ can be expressed by Equation 7 below.

$$T_1 \approx R_2 \qquad \text{[Equation 7]}$$
$$Q\left(1 - \frac{R_1 + R_2}{R_3}\right)\left[1 + \left(1 - \frac{R_1 + R_3}{2R_3}\right)e^{-\alpha t}\sin\beta t - e^{-\alpha t}\cos\beta t\right]$$
$$T_2 \approx R_2 Q\left(1 - \frac{R_1 + R_2}{R_3}\right)\left[\left(1 + \frac{R_1}{R_3}\right) + \left(1 + \frac{R_1 - R_2}{2R_3}\right)e^{-\alpha t}\sin\beta t - \left(1 + \frac{R_1}{R_{3r}}\right)e^{-\alpha t}\cos\beta t\right]$$

In this equation, coefficients $\alpha$, $\beta$, and $K$ are expressed by Equation 8 below.

$$\alpha \approx \frac{1}{K}\left[1 + \frac{R_1 + R_2}{2R_3}\right] \qquad \text{[Equation 8]}$$
$$\beta \approx \frac{1}{K}\left[1 - \frac{(R_1 + R_2)^2}{8R_3^2}\right]$$
$$K = C_1 R_1 = C_2 R_2$$

At this time, the temperature difference $\Delta T$ in the thermo-optical element 11 can be expressed by Equation 9 below.

$$\Delta T \approx \frac{R_1 R_2}{R_3} Q\left(1 - \frac{R_1 + R_2}{R_3}\right)\left[1 + \left(1 + \frac{R_1 + R_2}{2R_3}\right)e^{-\alpha t}\sin\beta - e^{-\alpha t}\cos\beta t\right] \qquad \text{[Equation 9]}$$

Here, in the state of the thermal equilibrium, the ratio $\Delta T/T_2$ can be expressed by Equation 10 below.

$$\frac{\Delta T}{T_2} \approx \frac{R_1}{R_3}\left(1 - \frac{R_1}{R_3}\right) \qquad \text{[Equation 10]}$$

As described above, $R_3$ is sufficiently greater than $R_1$ and $R_2$. Therefore, as in Equation 6, it can be understood that the temperature difference $\Delta T$ in the thermo-optical element 11 is very small. Further, when the values of $C_1 \times R_1$ and $C_2 \times R_2$ are substantially the same as each other, the response time constant $1/\alpha$ is almost K. Therefore, thermal equilibrium is realized at the time constant of about K with oscillation. Accordingly, when the values of $C_1 \times R_1$ and $C_2 \times R_2$ are substantially the same as each other, it can be understood that response is generally faster compared to a case in which there is a difference between the values of $C_1 \times R_1$ and $C_2 \times R_2$.

Next, the heat resistance $R_3$ corresponding to the heat transfer and the thermal radiation from the thermo-optical element 11 to the ambient gas will be described. In general, the thermal radiation to the ambient gas is sufficiently less than the heat transfer. Therefore, only the heat transfer to the ambient gas may be considered here. When it is assumed that h is a heat transfer ratio of the ambient gas and S is an area of the surface of the thermo-optical element 11 surrounded by the ambient gas, the heat resistance $R_3$ can be expressed by Equation 11 below.

$$R_3 = \frac{1}{hS} \qquad \text{[Equation 11]}$$

In this equation, the heat transfer ratio h is dependent on a flow rate of the ambient gas. However, the heat transfer ratio h is generally 10 W/(Km$^2$) at ordinary temperature and pressure. When the ambient gas is a gas which is large in a mean free path, the heat transfer ratio h is about ten times in some case. However, when the ambient gas is a gas containing nitrogen as a main component as in the air, the heat transfer ratio h is the above-described value and is excellent in terms of chemical reactivity and cost. Here, the main component is a component that occupies 50% or more of a mole content. When Equation 11 and "$\delta = \Delta T/T_2$" are substituted into Equation 10 and the approximation in which $R_3$ is sufficiently larger than $R_1$ is performed, the refractive index distribution ratio $\delta$ can be expressed by Equation 12 below.

$$\delta \approx R_1 hS \qquad \text{[Equation 12]}$$

The optical phase shifter 1 of which the refractive index distribution ratio $\delta$ is equal to or less than a desired value necessary for the optical phase shifter may be manufactured by setting "$R_1 \times h \times S$" less than the desired value from Equation 12. The distribution of the refractive index problematic in the optical phase shifter 1 is in a region through which the optical signal 30 incident on and exiting from the thermo-optical element 11 passes. Since the refractive index distribution ratio $\delta$ is a refractive index distribution ratio for the upper and lower ends of the thermo-optical element 11, as described above, the desired value of the refractive index distribution ratio $\delta$ may be calculated from the distribution of the refractive index in the required region (hereinafter, referred to as a beam diameter) through which the optical signal 30 passes.

In the manufacturing of the optical phase shifter 1, the optical signal 30 passing through the thermo-optical element 11 has a large beam diameter. Therefore, since the heat capacity and the heat resistance of the thermo-optical element 11 have to inevitably increase together to some extent due to the limit in which the optical signal 30 with the large beam diameter passes, the heat resistance of the temperature buffer section 13 is large, as described above. Further, since there is a limit to the structure, it is difficult to simultaneously decrease both $C_1 \times R_1$ and $C_2 \times R_2$. Accordingly, when the value and shape of the property of matter are determined so that $C_1 \times R_1$ and $C_2 \times R_2$ are approximately the same as each other, the component considerably slow in the response is not present, thereby obtaining the good result. Here, the ratio between $C_2 \times R_2$ and $C_1 \times R_1$ is preferably about double or less. In other words, $C_2 \times R_2$ is preferably in the range of half to double of $C_1 \times R_1$. That is, $C_1 \times R_1$ is preferably in the range of half to double of $C_2 \times R_2$.

When a simple model is applied, the heat capacity is directly proportional to a length and is directly proportional to a cross-sectional area, and the heat resistance is directly proportional to the length and is inversely proportional to the cross-sectional area. Therefore, the product of the heat capacity and the heat resistance is almost independent from the cross-section area, but is determined almost only by the length of a heat flow path. Accordingly, in the optical phase shifter 1 according to this embodiment, the cross-sectional areas of the thermo-optical element 11 and the temperature buffer unit 13 rarely affect the response speed. The response speed is mainly determined by the thicknesses of the thermo-optical element 11 and the temperature buffer section 13. Thus, by adjusting the thicknesses of the thermo-optical element 11 and the temperature buffer section 13, it is possible to simply satisfy the condition that $C_1 \times R_1$ and $C_2 \times R_2$ are substantially the same as each other.

In the optical phase shifter 1 according to this embodiment, the thermo-optical element 11 has a pair of surfaces (the front and rear surfaces) parallel to each other and the optical signal 30 passes through the pair of surfaces. That is, the beam diameter of the optical signal 30 is contained in each of the pair of surfaces. Thus, the region (beam diameter) in which the optical signal 30 passes through the thermo-optical element 11 is preferably the pair of surfaces parallel to each other. Further, the optical signal 30 preferably enters on and exits from the pair of surfaces. However, a region other than the region in which the optical signal 30 passes through the thermo-optical element 11 is not particularly limited, as long as there is no influence on optical performance.

In the optical phase shifter 1 according to this embodiment, the thermo-optical element 11 has the bottom surface perpendicular to the pair of surfaces and the bottom surface has contact with the temperature change section 12. When the pair of surfaces are substantially (nearly) perpendicular to the surface having contact with the temperature change section 12, the heat flow in the thermo-optical element is more constant, and thus the constant heat flow is preferable to suppress the temperature distribution in the thermo-optical element. Here, a substantially perpendicular angle is in the range of 85 degrees to 95 degrees. Of course, a vertical angle (90 degrees) is more preferable.

In the optical phase shifter 1 according to this embodiment, the thin film resistance pattern is formed on the temperature buffer section 13, and thus the temperature change section 12 is formed of the thin film resistor. The thin film resistor is preferably small in the heat capacity and the heat resistance, but the invention is not limited thereto. Another heating member may be used. The temperature change section 12 may be not only a heating member but also a heat absorbing member. An example of an element having a heat absorbing function is a Peltier element.

In terms of the suppression of the temperature distribution in the thermo-optical element 11, the temperature change section 12 is preferably made to be large in the surface of the temperature change section 12 having contact with the thermo-optical element 11. In particular, when the temperature change section 12 is the thin film resistor, it is preferable that the area of the thin film resistor is sufficiently large. In particular, the edge of the surface of the thermo-optical element 11 having contact with the temperature change section 12, that is, the edge of the bottom surface of the thermo-optical element 11 is preferably surrounded by the temperature change section 12. Then, the temperature distribution occurring in the thermo-optical element 11 is further suppressed.

Here, the thermo-optical element 11 has contact with the temperature change section 12 by adhering the thermo-optical element 11 and the temperature change section 12 using the insulating adhesive, and this adhering method is preferable since an assembly process can be simplified. Further, when the temperature change section 12 is the thin film resistor and the area of the thin film resistor is sufficiently large, an adhesive allowable range is broader, and thus the assembly process is further simplified.

Here, the thermo-optical element 11 is formed of the silicon substrate. The silicon substrate may be one of an amorphous silicon substrate, a polycrystalline silicon substrate, and a single crystal silicon substrate. Alternatively, the thermo-optical element 11 may be formed of a material having silicon as a main component. In general, optical glass has a low thermo-optical coefficient of about $1.0 \times 10^{-6}$ to $1.0 \times 10^{-5}$. However, since silicon has a high thermo-optical coefficient of about $1.0 \times 10^{-4}$, silicon is preferable as the material of the thermo-optical element. When silicon is used in the thermo-optical element 11, the temperature distribution is suppressed. Further, since silicon has high thermal conductivity compared to a general optical medium, the advantages of the invention can be obtained. However, the material of the thermo-optical element 11 is not particularly limited, as long as the refractive index changes dependently on temperature and the material has sufficiently high transmittance to the optical signal 30.

A temperature distribution simulation calculation has been carried out to confirm the advantages of the invention described with reference to FIG. 2. It results that a region with the temperature distribution less than 0.1% can be obtained in a region with about 1 mm by 1 mm with respect to a main surface (the surface through which the optical signal 30 passes) of the thermo-optical element 11. Since the beam diameter of the optical signal 30 is in the range of about 200 μm to about 600 μm, it is possible to obtain a sufficient broad region, in which the temperature distribution rarely occurs, even if accuracy of beam alignment is alleviated. The temperature distribution simulation calculation has been carried out to make a comparison with the structure shown in FIGS. 1 and 2 of JP 2009-300538 A described above. A region of a uniform temperature distribution may not be obtained in such a broad range of a size determined with reference to the beam diameter as in the present specification.

The materials in this embodiment are not particularly limited, as long as a relation of "the heat resistance of the heat dissipation section 14<<the heat resistance of the thermo-optical element 11≤the heat resistance of the temperature buffer section 13" is satisfied. Here, "a<<b" means that a is sufficiently less than b. Here, when a is sufficiently less than b, a is ⅕ or less of b. The temperature buffer section 13 may be formed of, for example, ceramics such as zirconium oxide (zirconia), aluminum oxide (alumina), or aluminum nitride, glass such as quartz glass (silica) or borosilicate glass, or resin such as glass epoxy. The heat dissipation section 14 may be formed of, for example, metal or alloy such as copper, aluminum, stainless steel, copper tungsten, or kovar. Further, the temperature buffer section 13 and the temperature change section 12 can be miniaturized at low cost by forming a thin film resistor as the temperature change section 12 on a surface of the temperature buffer section 13 formed of aluminum oxide.

The atmospheric gas in a module case on which the optical phase shifter 1 according to this embodiment is mounted may be a gas, such as a gas containing argon as a main component, other than nitrogen. Not only the temperature change section 12 and the thermo-optical element 11 are adhered by the insulating adhesive, but also a thin layer may be formed as an insulator on a surface of the temperature change section 12 and the thermo-optical element may be adhered on the thin layer using a conductive adhesive.

Second Embodiment

The configuration of an optical phase shifter 1 according to a second embodiment of the invention is basically the same as the configuration of the optical phase shifter 1 according to the first embodiment. However, the configuration of the optical phase shifter 1 according to the second embodiment is mainly different from the configuration of the optical phase shifter 1 according to the first embodiment in that a thermo-optical element 11 of the optical phase shifter 1 according to the second embodiment is disposed in vacuum. That is, the upper thermo-optical element 11 is surrounded by the vacuum. Therefore, of six surfaces of the thermo-optical element 11, five surfaces other than a bottom surface having contact with the temperature change section 12 have contact with the vacuum. That is, in the surfaces of the thermo-optical element 11, regions other than a region having contact with the temperature change section 12 are surrounded by the vacuum. Here, the vacuum refers to a state in which the degree of vacuum is 10000 Pa or less. The degree of vacuum is preferably 1000 Pa or less.

In general, when a surrounding wall surface is sufficiently distant and is sufficiently large, the amount of heat emitted through a thermal radiation P by a black body with a surface area S of an absolute temperature $T_o$ is expressed by Equation 13 below on the definition that $T_a$ is an absolute temperature of the surrounding wall surface.

$$P = \sigma S(T_o^4 - T_a^4) \quad \text{[Equation 13]}$$

In this equation, $\sigma$ is a Stefan-Boltzmann constant and $\sigma = 5.67 \times 10^{-8}$ W/(m$^2$k$^4$). When the thermo-optical element 11 is assumed to be a black body to simplify the description, the amount of heat emitted through the thermal radiation P by the thermo-optical element 11 can be expressed by Equation 13 on the definition that S is the area of the surface of the thermo-optical element 11 surrounded by the vacuum and $T_o$ is the absolute temperature of the thermo-optical element 11. In general, when a difference between $T_o$ and $T_a$ is sufficiently less than $T_o$, Equation 13 can be approximated to P~$5.67 \times 10^{-8} \times 4ST_o^3(T_o - T_a)$, and thus can be expressed by Equation 14 below.

$$R_3 = \frac{4000000}{ST_o^3} \quad \text{[Equation 14]}$$

When Equation 14 is substituted into Equation 6 obtained in the first embodiment, the refractive index distribution ratio $\delta$ can be expressed by Equation 15 below.

$$\delta \approx \frac{R_1}{R_3} = \frac{R_1 ST_o^3}{4000000} \quad \text{[Equation 15]}$$

The optical phase shifter 1 of which the refractive index distribution ratio $\delta$ is equal to or less than a desired value necessary for an element may be manufactured by setting $R_1 \times S \times T_o^3$ less than $4000000 \times \delta$ with respect to $\delta$ of the desired value from Equation 15. As in the first embodiment, the desired value of the refractive index distribution ratio $\delta$ may be calculated from the distribution of the refractive index obtained in the beam diameter of the optical signal 30.

Third Embodiment

A demodulator 2 according to a third embodiment of the invention is a demodulator that includes the optical phase shifter 1 according to the first or second embodiment. The demodulator according to this embodiment is employed a phase modulation scheme such as DPSK or DQPSK.

Figure 4:
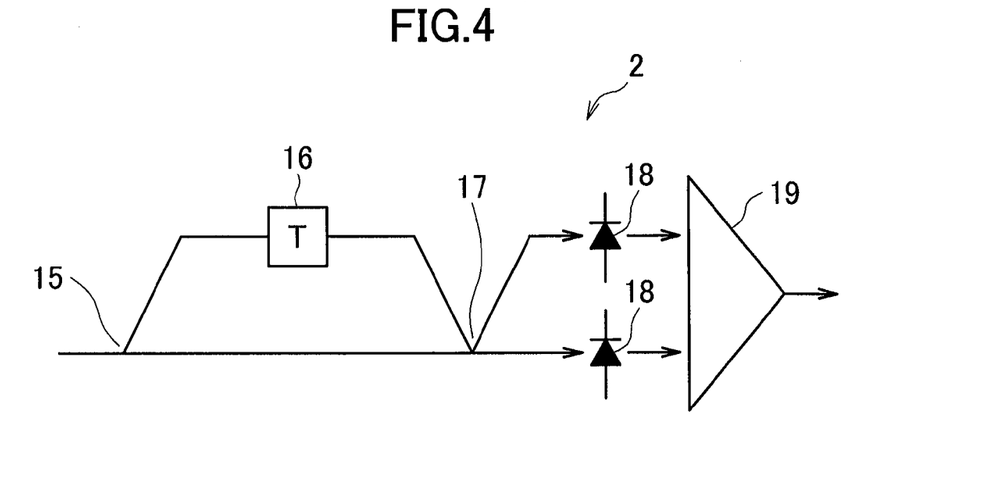
FIG. 4 is a block diagram illustrating the configuration of a demodulator according to a third embodiment of the invention.

FIG. 4 is a block diagram illustrating the configuration of the demodulator 2 according to this embodiment. When an optical signal is input from the left side of the drawing, an optical branching unit 15 branches the input optical signal into two optical signals. The branched two optical signals travel along two upper and lower optical paths shown in the drawing. Here, the optical signal travelling along the upper optical path is referred to as one optical signal and the optical signal travelling along the lower optical path is referred to as the other optical signal. An optical delay unit 16 is provided in the upper optical path. The optical delay unit 16 adds a delay time of one bit to the one optical signal. An optical recombining unit 17 is provided at the termination of the two optical paths. The optical recombining unit 17 converts the optical signal into an intensity modulation signal by recombining and interfering with the one optical signal to which the delay time is added and the other optical signal. In the demodulator 2, a section from the optical branching unit 15 to the optical recombining unit 17 may be referred to as a delay interferometer. The optical signal for which phase information is converted into intensity information in the delay interferometer is converted into an electric signal by a photoelectric conversion element 18, and then the electric signal is amplified by an amplifier 19. The amplified electric signal is output to the right side of the drawing, and then is input into an external signal discriminator (not shown). Here, the demodulator 2 according to this embodiment includes the delay interferometer to the amplifier 19. In some cases, the demodulator 2 may further include the signal discriminator or may include only the delay interferometer.

In order to demodulate the optical signal with high accuracy, in the delay interferometer, it is necessary to accurately set the delay time added to the one optical signal by the optical delay unit 16. The optical delay unit 16 includes the optical phase shifter 1 according to the first or second embodiment. The optical phase shifter 1 adjusts the added delay time with high accuracy. The demodulator 2 shown in FIG. 4 includes the optical phase shifter 1 only in the upper optical path. However, to adjust the delay time with higher accuracy, the optical phase shifter 1 may be provided in each of the two upper and lower optical paths.

Fourth Embodiment

A demodulator 2 according to a fourth embodiment of the invention is a demodulator that includes the optical phase shifter 1 according to the first or second embodiment, similarly to the third embodiment. Here, a delay interferometer of the demodulator is an interferometer called a Mach-Zehnder interferometer.

Figure 5:
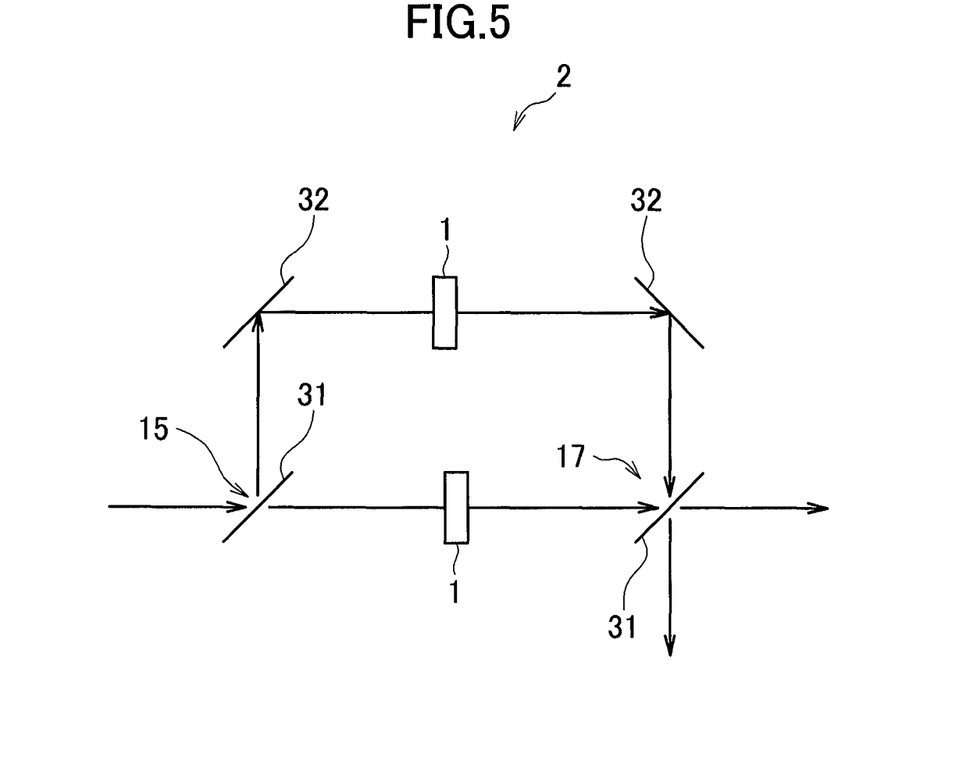
FIG. 5 is a block diagram illustrating the configuration of a demodulator according to a fourth embodiment of the invention.

FIG. 5 is a block diagram illustrating the configuration of the demodulator 2 according to this embodiment. FIG. 5 shows the configuration of the delay interferometer in the demodulator 2. The delay interferometer of the demodulator 2 according to this embodiment includes an optical branching unit 15, an optical recombining unit 17, two optical phase shifters 1, and two mirrors 32. The optical branching unit 15 is configured by a mirror 31 which is a spectroscopic mirror (half mirror). An optical signal input from the left side of the drawing is branched into two optical signals in the optical branching unit 15. The branched two optical signals travel along two upper and lower optical paths shown in the drawing. The two mirrors 32, which are mirrors with high reflectance, and the optical phase shifter 1 disposed between the two mirrors 32 are disposed along the upper optical path. One optical signal travelling along the upper optical path is reflected from the first mirror 32, passes through the optical phase shifter 1, is reflected from the second mirror 32 again, and then travels to the optical recombining unit 17. The optical phase shifter 1 is disposed in the lower optical path. The other optical signal travelling along the lower optical path passes through the optical phase shifter 1, and then travels to the optical recombining unit 17. The optical recombining unit 17 is configured by the mirror 31 which is the spectroscopic mirror (half mirror). The two optical signals are in the optical recombining unit 17.

In the delay interferometer shown in FIG. 5, an optical path difference between the two optical paths from the branching of the optical signal in the optical branching unit 15 to the recombining of the optical signals in the optical recombining unit 17 has to correspond to a delay time of one bit accurately. Further, it is necessary to adjust the optical path difference between the two optical paths with the degree of accuracy (that is, degree of high accuracy) shorter than a wavelength in accordance with phase information to be demodulated. By disposing the optical phase shifter 1 according to the first or second embodiment in each of the two optical paths in the demodulator 2 according to this embodiment, it is possible to realize the demodulator that accurately demodulates an optical phase modulation signal handled even in deformation caused due to deviation of a positional relation, temperature, or mechanical pressure in assembly or a change in the wavelength of the input optical signal. Further, as described above, the optical phase shifter 1 included in the demodulator 2 may not be disposed in each of the two optical paths, but may be disposed only in one of the optical paths. Alternatively, the plural optical phase shifters 1 may be disposed in one optical path. The disposition of the optical phase shifter may be selected dependently on the degree of required accuracy.

Fifth Embodiment

A demodulator 2 according to a fifth embodiment of the invention is a demodulator that includes the optical phase shifter 1 according to the first or second embodiment, as in the fourth embodiment. Here, a delay interferometer of the demodulator 2 is an interferometer called a Michelson interferometer.

Figure 6:
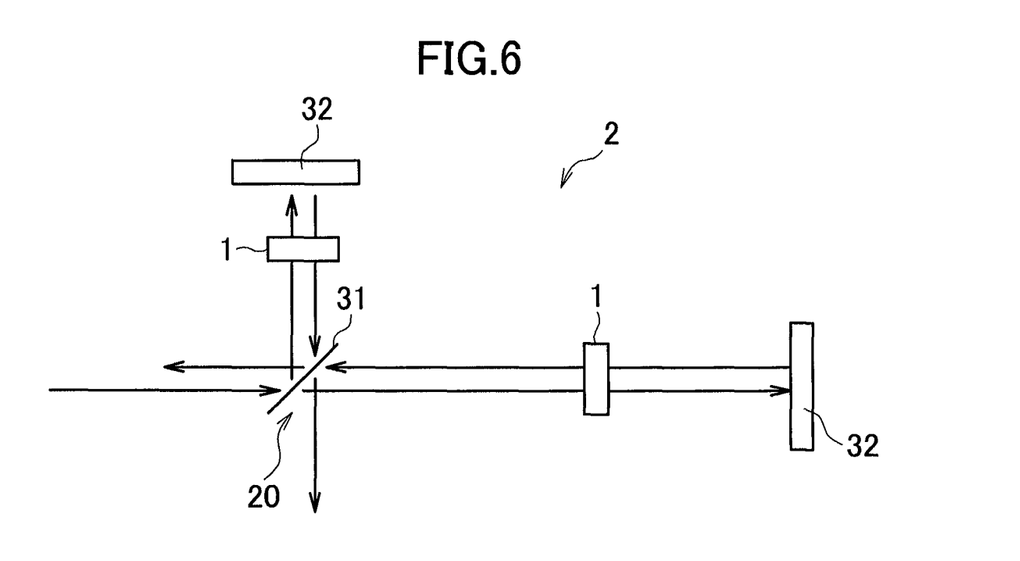
FIG. 6 is a block diagram illustrating the configuration of a demodulator according to a fifth embodiment of the invention.

FIG. 6 is a block diagram illustrating the configuration of the demodulator 2 according to the fifth embodiment of the invention. FIG. 6 shows the configuration of the delay interferometer in the demodulator 2. The delay interferometer of the demodulator 2 according to this embodiment includes an optical branching and recombining unit 20, two optical phase shifters 1, and two mirrors 32 which are mirrors with high reflectance. The optical branching and recombining unit 20 is configured by a mirror 31 which is a spectroscopic mirror. An optical signal input from the left side of the drawing is branched into two optical signals in the optical branching and recombining unit 20. One of the branched two optical signals travels along an upper optical path and the other optical signal travels along a right optical path. The mirror 32 and the optical phase shifter 1 disposed between the optical branching and recombining unit 20 and the mirror 32 are disposed along the upper optical path. The one optical signal traveling along the upper optical path passes through the optical phase shifter 1, is reflected from the mirror 32, passes through the optical phase shifter 1 again, and then travels to the optical branching and recombining unit 20. Likewise, the mirror 32 and the optical phase shifter 1 disposed between the optical branching and recombining unit 20 and the mirror 32 are disposed in the right optical path. The two optical signals are recombined again in the optical branching and recombining unit 20.

By disposing the optical phase shifter 1 according to the first or second embodiment in each of the two optical paths in the demodulator 2 according to this embodiment, it is possible to realize the demodulator that demodulates the optical phase modulation signal handled even in deformation caused due to deviation of the positional relation, temperature, or mechanical pressure in assembly or the change in the wavelength of the input optical signal with high accuracy, as in the fourth embodiment. As described above, the optical phase shifter 1 included in the demodulator 2 may not be disposed in each of the two optical paths, as in the fourth embodiment.

The optical phase shifter according to the invention and the demodulator using the optical phase shifter has hitherto been described. The invention is not limited to the case in which the optical phase shifter is included in the demodulator, but is broadly applicable to an optical phase shifter using a thermo-optical effect.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A optical phase shifter comprising:
    a thermo-optical element where a refractive index of the thermo-optical element with respect to an input optical signal is temperature dependent;
    a temperature change section contacting one end of the thermo-optical element, and a temperature of the temperature change section changes a temperature of the thermo-optical element to a desired temperature;
    a heat dissipation section disposed on an opposite side of the thermo-optical element than the temperature change section and which enters a state of thermal equilibrium at a different temperature than the temperature of the temperature change section; and
    a temperature buffer section disposed between and contacting the temperature change section and the heat dissipation section where the temperature buffer section has a heat resistance greater than the heat dissipation section,
    wherein the thermo-optical element is surrounded by an ambient gas, and
    wherein a product $R_1 \times S \times h$ of a heat resistance $R_1$ of the thermo-optical element, an area S of a surface of the thermo-optical element surrounded by the ambient gas, and a heat transfer ratio h of the ambient gas is less than a desired refractive index distribution ratio $\delta$ of the thermo-optical element.

2. The optical phase shifter according to claim 1, wherein the ambient gas is a gas which contains nitrogen as a main component.

3. An optical phase shifter comprising:
    a thermo-optical element where a refractive index of the thermo-optical element with respect to an input optical signal is temperature dependent;
    a temperature change section contacting one end of the thermo-optical element, and a temperature of the temperature change section changes a temperature of the thermo-optical element to a desired temperature;
    a heat dissipation section disposed on an opposite side of the thermo-optical element than the temperature change section and which enters a state of thermal equilibrium at a different temperature than the temperature of the temperature change section; and
    a temperature buffer section disposed between and contacting the temperature change section and the heat dissipation section where the temperature buffer section has a heat resistance greater than the heat dissipation section, wherein the thermo-optical element is surrounded by a vacuum, and wherein a product $R_1 \times S \times T_o^3$ of a heat resistance $R_1$ of the thermo-optical element, an area S of a surface of the thermo-optical element surrounded by the vacuum, and a cubed absolute temperature $T_o$ of the thermo-optical element is less than a product 4000000×δ of a desired refractive index distribution ratio δ of the thermo-optical element and a constant 4000000.

4. An optical phase shifter comprising:

a thermo-optical element where a refractive index of the thermo-optical element with respect to an input optical signal is temperature dependent;

a temperature change section contacting one end of the thermo-optical element, and a temperature of the temperature change section changes a temperature of the thermo-optical element to a desired temperature;

a heat dissipation section disposed on an opposite side of the thermo-optical element than the temperature change section and which enters a state of thermal equilibrium at a different temperature than the temperature of the temperature change section; and a temperature buffer section disposed between and contacting the temperature change section and the heat dissipation section where the temperature buffer section has a heat resistance greater than the heat dissipation section, wherein a product $C_2 \times R_2$ of a heat capacity $C_2$ of the temperature buffer section and a heat resistance $R_2$ of the temperature buffer section is in the range of half to double of a product $C_1 \times R_1$ of a heat capacitor $C_1$ of the thermo-optical element and a heat resistance $R_1$ of the thermo-optical element.

5. The optical phase shifter according to claim 1, wherein the thermo-optical element has a pair of surfaces parallel to each other in a region through which the input optical signal passes and the pair of surfaces are substantially perpendicular to a surface of the thermo-optical element contacting the temperature change section.

6. The optical phase shifter according to claim 1, wherein an edge of a surface of the thermo-optical element contacting the temperature change section is surrounded by the temperature change section.

7. The optical phase shifter according to claim 1, wherein the temperature change section is a thin film resistor formed on the temperature buffer section and the thermo-optical element is adhered with an insulating adhesive to contact the temperature change section.

8. The optical phase shifter according to claim 1, wherein the thermo-optical element contains silicon as a main component.

9. A demodulator comprising one or a plurality of the optical phase shifters according to claim 1.

10. The demodulator according to claim 9, wherein when the input optical signal is branched into two optical signals, the single or each of the plurality of optical phase shifters shifts a phase of one of the two optical signals.

11. The demodulator according to claim 9, further comprising:

a Mach-Zehnder interferometer, wherein the single or the plurality of optical phase shifters are disposed in the Mach-Zehnder interferometer.

12. The demodulator according to claim 9, further comprising:

a Michelson interferometer, wherein the single or the plurality of optical phase shifters are disposed in the Michelson interferometer.

\* \* \* \* \*